(12) United States Patent
Kobayashi

(10) Patent No.: US 11,977,796 B2
(45) Date of Patent: May 7, 2024

(54) CONTENT PROVISION DEVICE, CONTENT PROVISION METHOD, PROGRAM, AND RECORDING MEDIUM

(71) Applicant: FUJIFILM Corporation, Tokyo (JP)

(72) Inventor: Daisuke Kobayashi, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 18/148,764

(22) Filed: Dec. 30, 2022

(65) Prior Publication Data

US 2023/0289113 A1 Sep. 14, 2023

(30) Foreign Application Priority Data

Mar. 9, 2022 (JP) .................................. 2022-035904

(51) Int. Cl.
*G06F 3/12* (2006.01)
*H04L 9/40* (2022.01)

(52) U.S. Cl.
CPC .......... *G06F 3/1222* (2013.01); *G06F 3/1231* (2013.01); *H04L 63/0876* (2013.01)

(58) Field of Classification Search
CPC . G06T 2207/10004; G06T 2207/10016; G06T 2207/10024; G06T 2207/30204; G06T 7/20; G06V 40/10; G11B 27/005; G11B 27/034; G11B 27/11; G11B 27/19; G11B 27/36; H04L 12/2803; H04L 41/0806; H04L 41/0889; H04L 67/34
USPC ........................................................ 358/474
See application file for complete search history.

(56) References Cited

U.S. PATENT DOCUMENTS

| | | | | |
|---|---|---|---|---|
| 7,971,133 | B2 * | 6/2011 | Fujita ................... | G06F 16/957 |
| | | | | 715/208 |
| 9,348,548 | B2 * | 5/2016 | Tajima ................... | G06F 3/1231 |
| 10,078,475 | B2 * | 9/2018 | Ohara ................... | G06F 3/1205 |
| 2011/0242569 | A1 * | 10/2011 | Ohara ................... | G06F 3/1228 |
| | | | | 358/1.13 |

(Continued)

FOREIGN PATENT DOCUMENTS

| JP | 2013-025569 A | 2/2013 |
| JP | 2016-058024 A | 4/2016 |

OTHER PUBLICATIONS

The extended European search report issued by the European Patent Office dated Aug. 3, 2023, which corresponds to European Patent Application No. 23150828.4-1213 and is related to U.S. Appl. No. 18/148,764.

*Primary Examiner* — Negussie Worku

(74) *Attorney, Agent, or Firm* — Studebaker & Brackett PC

(57) ABSTRACT

Provided are a content provision device, a content provision method, a program, and a recording medium capable of suppressing unpermitted obtaining of content by a simple process.

In the present invention, a processor executes processing of acquiring identification information of a device used by the user to use the content and transmitting an image based on the identification information to the user, processing of receiving first data, which is generated by reading the image by a reading device of the user, and second data for specifying the identification information from the reading device, and processing of providing the content to the user in a case in which the identification information specified from the image indicated by the first data and the identification information specified from the second data match.

17 Claims, 7 Drawing Sheets

(56) References Cited

U.S. PATENT DOCUMENTS

| | | | | |
|---|---|---|---|---|
| 2012/0106805 A1* | 5/2012 | Shuster | ............... | G06V 40/67 |
| | | | | 382/115 |
| 2014/0085486 A1* | 3/2014 | Emura | ............... | H04N 23/64 |
| | | | | 348/207.1 |
| 2014/0266639 A1* | 9/2014 | Zises | ............... | G08C 17/02 |
| | | | | 340/12.28 |
| 2015/0355865 A1* | 12/2015 | Ohara | ............... | G06F 3/1247 |
| | | | | 358/1.15 |
| 2016/0078904 A1 | 3/2016 | Yamaji et al. | | |
| 2016/0155120 A1* | 6/2016 | Hurry | ............... | H04N 21/2542 |
| | | | | 705/71 |
| 2017/0257358 A1* | 9/2017 | Ebrahimi | ............... | H04L 9/3236 |
| 2020/0037144 A1* | 1/2020 | Chen | ............... | H04L 41/22 |
| 2020/0065638 A1* | 2/2020 | Nakai | ............... | G06K 19/06037 |
| 2020/0412712 A1 | 12/2020 | Murata et al. | | |
| 2023/0291730 A1* | 9/2023 | Murata | ............... | G06F 21/36 |
| 2023/0325074 A1* | 10/2023 | Osaki | ............... | G06F 21/6218 |
| | | | | 726/26 |

\* cited by examiner

FIG. 4

FIRST MANAGEMENT DATA

| ACCOUNT ID | IDENTIFICATION ID OF USER TERMINAL | IDENTIFICATION ID OF PRINTER | PURCHASED CONTENT ID | PROVISION AVAILABLE PERIOD | THE NUMBER OF PROVISION AVAILABLE TIMES (REMAINING NUMBER) |
|---|---|---|---|---|---|
| U00001 | TM0001020 | PR001001 | CNT001xa | 1/10/2022 TO 6/10/2022 | 10 TIMES (7 TIMES) |
| ····· | ····· | ····· | ····· | ····· | ····· |

SECOND MANAGEMENT DATA

| CONTENT ID | ACCOUNT ID OF CONTENT PURCHASER | CUMULATIVE NUMBER OF PURCHASERS |
|---|---|---|
| CNT002wy | U00001 ⋮ U00120 | 120 PERSONS |
| ⋮ | ⋮ | ⋮ |

CONTENT PROVISION DEVICE, CONTENT PROVISION METHOD, PROGRAM, AND RECORDING MEDIUM

CROSS-REFERENCE TO RELATED APPLICATIONS

The present application claims priority under 35 U.S.C. § 119 to Japanese Patent Application No. 2022-035904, filed on Mar. 9, 2022. Each of the above application(s) is hereby expressly incorporated by reference, in its entirety, into the present application.

BACKGROUND OF THE INVENTION

1. Field of the Invention

The present invention relates to a content provision device, a content provision method, a program, and a recording medium that provide content by using, as a trigger, reading of an image.

2. Description of the Related Art

Provision of content to a user through network communication has already been performed. For example, as disclosed in JP2016-58024A, the content may be provided by using reading of an image for obtaining the content, such as a QR code (registered trademark), as a trigger.

In JP2016-58024A, in a case in which a printed matter on which the image for obtaining the content is printed is imaged (captured) by an information terminal, such as a smartphone, video content is provided by using the imaging as a trigger. The provided video content is content for augmented reality (AR), and is combined with a captured video thereof and displayed on a display screen of the information terminal that images the printed matter.

SUMMARY OF THE INVENTION

The image for obtaining the content should be originally distributed to an appropriate provision destination of the content, such as a purchaser of the content. However, in a case in which another user illegally acquires the image for obtaining the content by unpermitted duplication or the like and reads the image, there is a concern that the content is obtained without permission.

As a method of avoiding the unpermitted obtaining of the content, it is conceivable to cause the user to input a password, a code number, or the like as information for obtaining the content. It should be noted that, in the method described above, it is necessary for the user to remember the information, such as the password, and there is a concern that the information is lost due to carelessness of the user or the like. Moreover, in a case in which the information described above is unintentionally leaked, there is a probability that the content is obtained without permission.

The present invention has been made in view of the circumstances described above, and specifically, provides a content provision device, a content provision method, a program, and a recording medium capable of suppressing unpermitted obtaining the content by a simple process.

In order to achieve the object described above, an aspect of the present invention relates to a content provision device that provides content to a user, the device comprising a processor, in which the processor executes processing of acquiring identification information of a device used by the user to use the content and transmitting an image based on the identification information to the user, processing of receiving first data, which is generated by reading the image by a reading device of the user, and second data for specifying the identification information from the reading device, and processing of providing the content to the user in a case in which the identification information specified from the image indicated by the first data and the identification information specified from the second data match.

Moreover, the processor may provide the content that is able to be output in a case in which the acquired identification information and the identification information of the device match.

Moreover, the processor may acquire an identification ID of a printer that prints the content, as the identification information.

Moreover, in a case in which a user terminal that is able to control the printer acquires the identification ID of the printer, the processor may acquire the identification ID by receiving data indicating the identification ID transmitted from the user terminal.

Moreover, the processor may transmit content that is usable through the reading device to the reading device, as the content.

Moreover, the content that is usable through the reading device may be video content for augmented reality that is combined with a captured video captured by the reading device and displayed.

Moreover, the processor may store a provision available period of the content in a storage device in association with the user. In this case, it is suitable that the processor provides the content to the user in the provision available period.

Moreover, the processor may store the number of provision available times of the content in a storage device in association with the user. In this case, it is suitable that, in a case in which the number of times the content is provided is less than the number of provision available times, the processor provides the content to the user.

Moreover, in a case in which the identification information specified from the image indicated by the first data and the identification information specified from the second data match and the user satisfies a preset condition, the processor may provide the content to the user.

Moreover, in order to solve the object described above, another aspect of the present invention relates to a content provision method of providing content to a user, the method comprising causing a processor to execute a step of acquiring identification information of a device used by the user to use the content and transmitting an image based on the identification information to the user, a step of receiving first data, which is generated by reading the image by a reading device of the user, and second data for specifying the identification information from the reading device, and a step of providing the content to the user in a case in which the identification information specified from the image indicated by the first data and the identification information specified from the second data match.

Moreover, the processor may provide the content that is able to be output in a case in which the acquired identification information and the identification information of the device match.

Moreover, the processor may transmit content that is usable through the reading device to the reading device, as the content.

Moreover, in a case in which the identification information specified from the image indicated by the first data and the identification information specified from the second data match and the user satisfies a preset condition, the processor may provide the content to the user.

Moreover, according to still another aspect of the present invention, it is possible to realize a program causing a computer to execute each step included in the content provision method described above. Further, according to still another aspect of the present invention, it is possible to realize a computer-readable recording medium in which a program causing a computer to execute each step included in the content provision method described above is recorded.

According to the present invention, a content provision device, a content provision method, a program, and a recording medium capable of suppressing unpermitted obtaining of the content by a simple process are realized.

BRIEF DESCRIPTION OF THE DRAWINGS

FIG. 4 is a diagram showing an example of first management data stored in a storage device.

DESCRIPTION OF THE PREFERRED EMBODIMENTS

Figure 1:
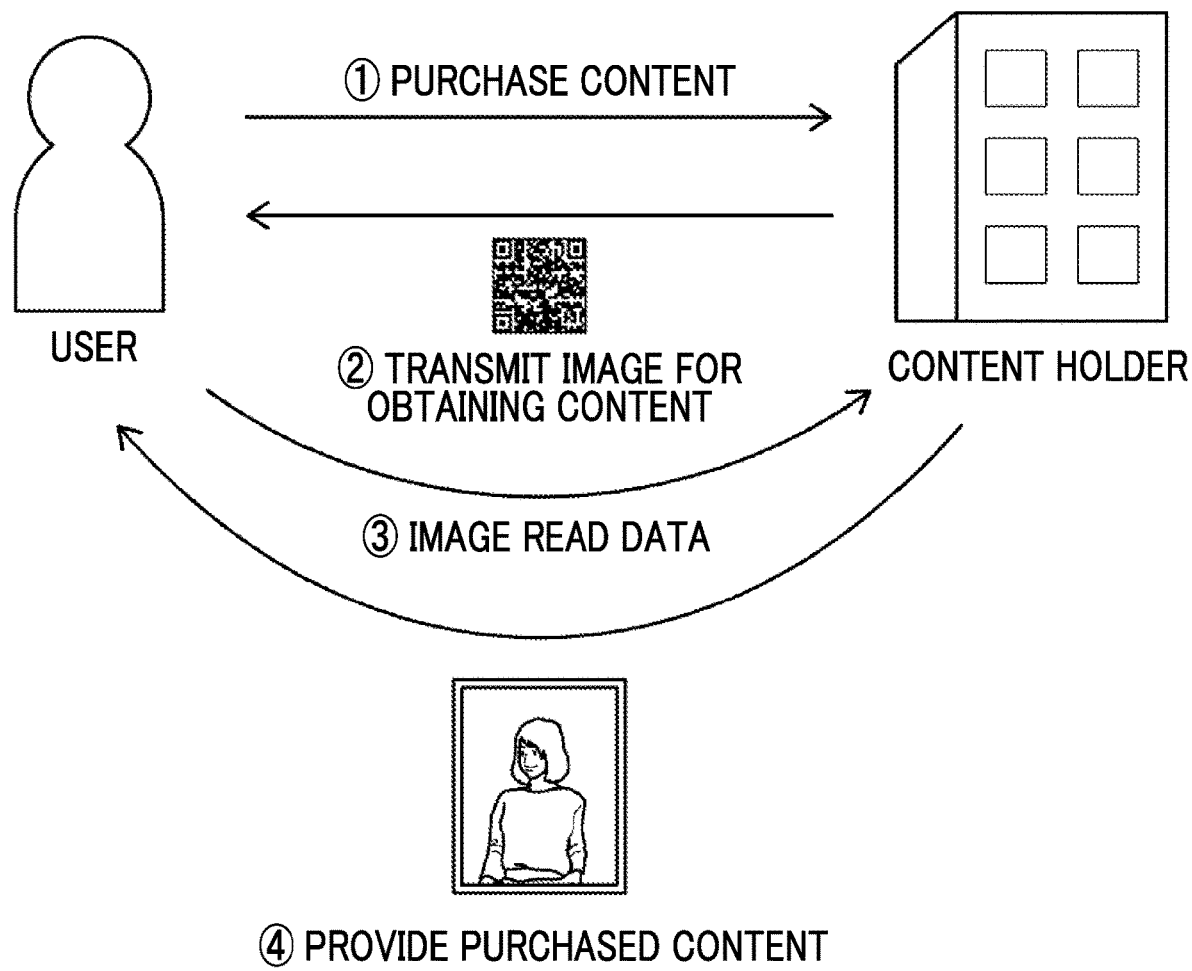
FIG. 1 is a diagram showing a procedure for obtaining content.

One embodiment of the present invention (hereinafter, the present embodiment) will be described with reference to the drawings. It should be noted that the embodiment described below is merely an example for ease of understanding of the present invention, and is not intended to limit the present invention. Moreover, the present invention can be changed or improved from the embodiment described below without departing from the spirit of the present invention. Moreover, the present invention includes its equivalents.

In the present specification, the concept of "device" includes a single device that exerts a specific function in one device, and includes a plurality of devices that are distributed and present independently of each other and exert a specific function in cooperation (coordination) with each other.

Moreover, in the present specification, an "image" is image data unless otherwise specified. Examples of the image data include lossy compressed image data, such as joint photographic experts group (JPEG) format, and lossless compressed image data, such as graphics interchange format (GIF) or portable network graphics (PNG) format. Moreover, the image data may include information, such as a file name, creation date and time, and a reproduction method.

Moreover, in the present specification, a "user" is a user who uses a content provision device according to the embodiment of the present invention. To use the content provision device is to use a function of the content provision device, and to use the function of the content provision device by another device (for example, a terminal owned by the user), in addition to directly operating the content provision device.

Content Provision Service

A service (hereinafter, a content provision service) realized by the content provision device and a content provision method according to the present embodiment will be described.

The content provided in the content provision service is digital content that can be distributed through a network, that is, content data. The content data may include a file name, creation date and time, an output or reproduction method, and the like.

The content that can be provided by the content provision service is an image (image data) for printing, for example. It should be noted that the content that can be provided is not particularly limited, and may be a video or image content that can be displayed on a display device, such as a display, audio content that can be output by a loudspeaker (speaker), or content that is a combination thereof.

An outline of a procedure for obtaining the content will be described with reference to FIG. 1. A user who is a user of the content provision service operates, for example, an information processing terminal (hereinafter, a user terminal 11) to access a site of a content holder and purchase desired content on the site. The content holder generates an image for obtaining the purchased content (hereinafter, an image for obtaining the content) and transmits the image for obtaining the content to the user who is a content purchaser.

As shown in FIG. 1, the image for obtaining the content is configured by, for example, a QR code (registered trademark) and can be received through an email, an application program dedicated to the content provision service, or the like. In a case in which the image for obtaining the content is received, the user reads the image for obtaining the content by the user terminal 11. Here, reading the image for obtaining the content means acquiring information embedded in the image by reading the image for obtaining the content (specifically, analyzing the image data) by an image reading function provided in the user terminal 11. The information embedded in the image for obtaining the content is, for example, a uniform resource locator (URL) of a content obtaining destination, and various parameters for obtaining the content.

It should be noted that the image for obtaining the content is not limited to an encoded image, such as a QR barcode (registered trademark), need only be a readable image, and may be, for example, a character (text), a symbol, a number, an encrypted character, or the like. Moreover, the image for obtaining the content may be obfuscated by incorporating other information, such as an ID of the content holder, an identification ID of a venue where the content can be obtained (for example, an event venue), a check digit, and the like.

Moreover, the method of reading the image for obtaining the content is not limited to the method described above. For example, a format may be adopted in which the image for obtaining the content is printed, a formed portion of the image for obtaining the content in the printed matter is imaged by an imaging device of the user terminal 11, and the obtained captured image is analyzed to acquire the information described above.

In a case in which the image for obtaining the content is read to acquire predetermined information, as shown in FIG. 1, data based on the acquired information is generated by the user terminal 11 and transmitted to the content holder. Here, transmitting the data to the content holder means transmitting the data to a content provision computer (specifically, the server for provision 10) used by the content holder via the network.

As shown in FIG. 1, the content holder provides the content purchased by the user (hereinafter, purchased content) from a content group held by the content holder in accordance with the information specified from the read image for obtaining the content. As a result, the user can obtain the purchased content via the network, and specifically, can download the purchased content from the user terminal 11. Then, the user can output the obtained purchased content, and specifically, can print the purchased content by a printer 12 owned by the user.

In addition to the content provision service, from the viewpoint of content protection, a certain limitation may be provided on the provision of the content to the user (that is, the download of the purchased content). For example, a provision available period of the content (that is, a period in which the purchased content can be downloaded) may be limited to a certain period from a time when the user purchases the content. In other words, a validity period may be set for the image for obtaining the content. The provision available period of the content can be optionally determined and may be set by the content holder, for example.

Moreover, the number of provision available times (number of download available times) of the content may be determined. That is, the purchased content can be provided to the user until a remaining number of the number of provision available times set for the user is 0, whereas the provision of the purchased content to the user may be limited (ends) in a case in which the remaining number is 0. The number of provision available times of the content can be optionally determined and may be set by the content holder, for example.

Moreover, the purchased content may be provided only to a user who satisfies a content provision condition. Here, the content provision condition is a preset condition regarding whether or not the content can be provided, for example, that a predetermined number or more of the content are purchased, or that a purchase amount of the content is equal to or greater than a predetermined amount.

Moreover, the limitation described above may be released for the content in which the number of purchasers is equal to or greater than a certain number (hereinafter, popular content). In that case, the user who has purchased the popular content may be able to freely obtain (download) the popular content without being limited by the period and the number of times.

By the way, in the content provision service described above, the purchased content can be obtained (downloaded) by reading the image for obtaining the content. Therefore, in a case in which the image for obtaining the content is duplicated without permission and the duplicated image for obtaining the content is read, even a user who has not normally purchased the content can obtain (download) the purchased content. In such a situation, there is a concern that the content is not appropriately protected.

On the other hand, as a method of avoiding the unpermitted obtaining of the content, it is conceivable to cause the user to input authentication information, such as a password or a code number in a case of obtaining the content, and to permit only the user who has input the correct authentication information to obtain the content. It should be noted that, in such a method, it is necessary for the user to remember the authentication information, and there is a concern that the authentication information is lost due to carelessness of the user or the like. Moreover, in a case in which the authentication information is unintentionally leaked or stolen, even a person who has not purchased the content can obtain the content. Further, even in a case in which the user who is the content purchaser provides the authentication information to another person, a person who has not purchased the content can obtain the content as in the case described above.

Therefore, in the present embodiment, measures are taken to protect the content, specifically, a content protection control described below is executed. As a result, unpermitted obtaining of the content can be suppressed by a relatively simple procedure without imposing a management burden of the authentication information, such as the password, on the user.

Content Provision System

Figure 2:
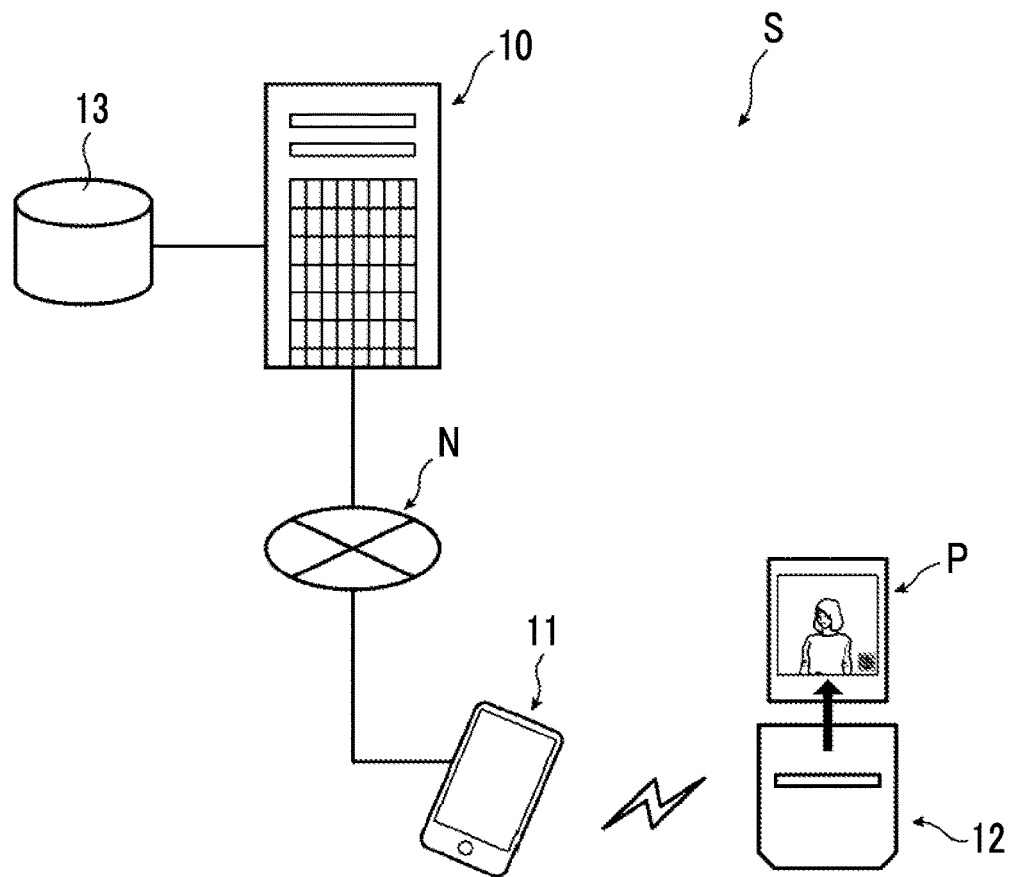
FIG. 2 is a diagram showing a content provision system including a content provision device according to one embodiment of the present invention.

Next, a configuration of a communication system, that is, a content provision system S, which is constructed to realize the content provision service, will be described with reference to FIG. 2. As shown in FIG. 2, the content provision system S is composed of the server for provision 10, the user terminal 11, the printer 12, and the like.

In the following, each device will be described.

Server for Provision

The server for provision 10 is a computer used by the content holder, specifically, a server computer. The server for provision 10 serves as a platform for the content provision service and constitutes the content provision device 20 according to the embodiment of the present invention. The server for provision 10 may be a server for a cloud service, specifically, a server computer for an application service provider (ASP), a software as a service (SaaS), a platform as a service (PaaS), or an infrastructure as a service (IaaS).

The server for provision 10 can communicate with the user terminal 11 via an external network N, such as the Internet or a mobile communication network, and acquires the information from the user terminal 11. The acquired information is stored in a storage device 13, and the server for provision 10 can read out the information stored in the storage device 13. The storage device 13 is composed of, for example, storage built in or external to the server for provision 10, a network attached storage (NAS), or the like. It should be noted that the present invention is not limited to this, the storage device 13 may be a third computer capable of communicating with the server for provision 10, for example, so-called online storage.

The server for provision 10 executes various information processing related to the content provision service. Specifically, the server for provision 10 executes the content protection control and provides the purchased content to the user in a case in which the user who requests the content provision is the purchaser of the content.

User Terminal

The user terminal 11 is the information processing terminal operated by the user in a case of using the content provision service, and is composed of, for example, a personal computer (PC), a smartphone, and a tablet terminal. The application program dedicated to the content provision service (hereinafter, an application for provision) is installed in the user terminal 11. The application for provision is executed by a processor provided in the user terminal 11. As a result, the user can view the information related to the use of the content provision service on the user terminal 11. For example, in a case in which the user terminal 11 receives the image for obtaining the content from the server for provision 10, a push notification is displayed on the display screen of the user terminal 11.

Moreover, the user terminal 11 can read the image for obtaining the content by the function of the application for provision. That is, in the present embodiment, the user terminal 11 corresponds to the reading device. Moreover, the user terminal 11 acquires the information, such as the URL of the content obtaining destination, from the read image for obtaining the content, generates data based on the acquired information (specifically, first data described below), and transmits the generated data to the server for provision 10.

Moreover, the user terminal 11 receives a user operation performed by using the function of the application for provision, generates the data in accordance with the user operation, and transmits the generated data to a predetermined transmission destination. For example, in a case in which an account for service is issued in a case of using the content provision service, the user performs an input operation of information necessary for issuing the account. The user terminal 11 receives the input operation and transmits data indicating input contents to the server for provision 10. In this case, the data is transmitted in a state of being associated with the identification ID of the user terminal 11.

Moreover, the user terminal 11 receives the series of operations performed in a case in which the user purchases the content, for example, an operation of selecting the content which is a purchase target, and an operation of paying a charge for the content (settlement operation). Then, the user terminal 11 transmits the data in accordance with the received operation contents to the server for provision 10. In this case, the data is transmitted in a state of being associated with the identification ID of the user terminal 11.

Further, the user terminal 11 can download the purchased content by the function of the application for provision. Specifically, in a case in which the purchased content is transmitted from the server for provision 10, the user terminal 11 receives the content. Then, in a case in which the purchased content is received, the user terminal 11 can control the printer 12 and cause the printer 12 to print the purchased content.

Printer

The printer 12 is a device used by the user to use the purchased content, and is wirelessly connected to the user terminal 11 by Wi-Fi (registered trademark) or Bluetooth (registered trademark). It should be noted that the present invention is not limited to this, and the printer 12 may be connected to the user terminal 11 by a wired method. Moreover, the printer 12 itself may have a function of transmitting the data to the server for provision 10.

The printer 12 prints the content (purchased content) under the control of the user terminal 11. That is, the content provided in the present embodiment is content that can be output by the user terminal 11 controlling the printer 12. From this viewpoint, it can be said that the content can be used through the user terminal 11.

The printer 12 according to the present embodiment prints an image by an instant photographic method. That is, the printer 12 exposes a photosensitive film accommodated in the printer to form a latent image, and visualizes the latent image with a developer in a developer pot provided at an end part of the film. In a case in which the development proceeds after the photosensitive film is ejected to the outside of the printer, a complete image is formed on a film surface.

It should be noted that the image printing method by the printer 12 is not limited to the instant photographic method, and may be an inkjet method, a sublimation-type thermal transfer method, an electrophotographic method using a toner, or the like.

Moreover, unique identification information (specifically, the identification ID) is added to the printer 12. The identification ID of the printer 12 is, for example, described on a label (not shown) attached to an outer surface of a housing of the printer 12, or printed or engraved on a bottom surface of the printer 12. Moreover, the identification ID described above is stored in a memory in the printer 12 (hereinafter, a printer-side memory). The user terminal 11 can acquire the identification ID stored in the printer-side memory by communicating with the printer 12.

Configuration Example of Content Provision Device

Next, a configuration example of the content provision device 20 according to the present embodiment will be described. As described above, the content provision device 20 according to the present embodiment is composed of the server for provision 10. It should be noted that the number of computers constituting the content provision device 20 may be one or two or more. That is, the content provision device 20 is realized by a processor and a program that can be executed by the processor, and is composed of, for example, a general-purpose computer.

Figure 3:
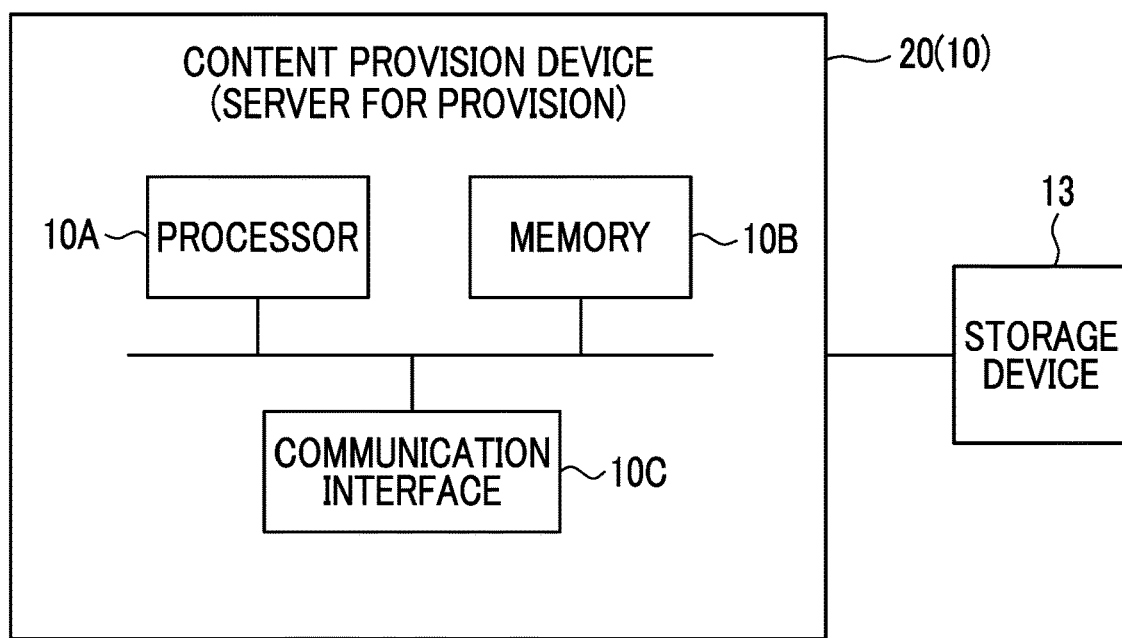
FIG. 3 is a diagram showing a configuration example of the content provision device according to one embodiment of the present invention.

As shown in FIG. 3, the server for provision 10 that constitutes the content provision device comprises a processor 10A, a memory 10B, a communication interface 10C, and the like.

The processor 10A is composed of, for example, a central processing unit (CPU), a graphics processing unit (GPU), a digital signal processor (DSP), or a tensor processing unit (TPU).

The memory 10B is composed of, for example, a semiconductor memory, such as a read only memory (ROM) and a random access memory (RAM).

The communication interface 10C is composed of, for example, a network interface card or a communication interface board.

Moreover, a program for functioning as the content provision device according to the embodiment of the present invention (hereinafter, a program for the content provision) is installed in the server for provision 10. The program for the content provision is a program for causing the computer to execute each step included in the content provision method according to the embodiment of the present invention. That is, the processor 10A reads out the program for the content provision and executes the series of processing related to the content provision service described above.

It should be noted that the program for the content provision may be acquired by being read from a computer-readable recording medium, or may be acquired by being received (downloaded) through a communication line, such as the Internet or an intranet.

The content provision device 20 is connected to the storage device 13 and can read out the information stored in the storage device 13. The information necessary for the content provision service is stored in the storage device 13, and for example, the data acquired by the content provision device 20 from the user terminal 11 is stored.

Moreover, first management data for managing a usage record of the content provision service or the like is stored in the storage device 13 for each user. As shown in FIG. 4, the first management data includes an account ID, an identification ID of each of the user terminal 11 and the printer 12, and an ID of the purchased content for the user who has purchased the content. Moreover, the first management data may include the provision available period of the content purchased by the user, the number of provision available times, the remaining number thereof, and the like. Further, the first management data may include flag information indicating whether or not the user satisfies the content provision condition (for example, a condition in which the user has purchased a predetermined number or more of the content).

Figures 5, 6:
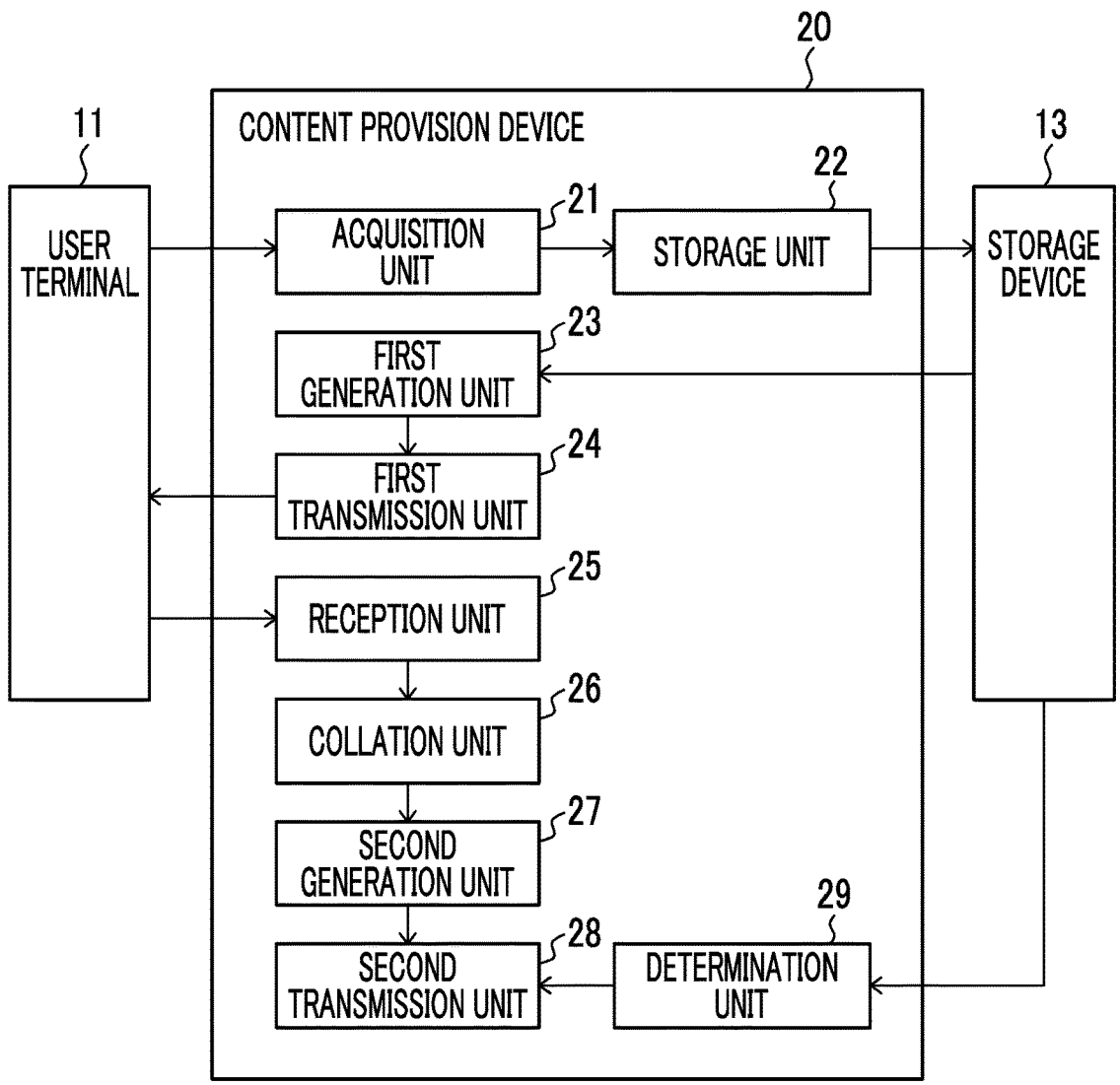
FIG. 5 is a diagram showing an example of second management data stored in the storage device.
FIG. 6 is an explanatory diagram showing a function of the content provision device according to one embodiment of the present invention.

Moreover, the storage device 13 stores second management data for the content holder to manage a provision record or the like of each of the held content groups, for each content. As shown in FIG. 5, the second management data includes an ID of the content, an account ID of the user who has purchased the content, a cumulative number of purchasers, and the like.

The configuration of the content provision device 20 will be described again from a functional aspect with reference to FIG. 6. The content provision device 20 includes an acquisition unit 21, a storage unit 22, a first generation unit 23, a first transmission unit 24, a reception unit 25, a collation unit 26, a second generation unit 27, a second transmission unit 28, and a determination unit 29. These functional units are realized by the cooperation between a hardware device provided in the server for provision 10 and the software including the program for the content provision described above.

The acquisition unit 21 acquires the identification ID (corresponding to the identification information) of the printer 12 of the user. A method of acquiring the identification ID of the printer 12 by the acquisition unit 21 includes, for example, a method of acquiring data indicating the input contents in a case in which the user inputs information necessary for issuing the account for service. Moreover, in a case in which the user terminal 11 communicates with the printer 12 to acquire the identification ID of the printer 12 and the data indicating the acquired identification ID is transmitted from the user terminal 11, the identification ID may be acquired by receiving the data. Moreover, in a case in which the data indicating the identification ID of the printer 12 is requested from the user terminal 11 and the user terminal 11 transmits the data in response to the request, the identification ID may be acquired by receiving the transmitted data.

The storage unit 22 stores the identification ID of the printer 12, which acquired by the acquisition unit 21, in the storage device 13. In this case, the storage unit 22 stores the identification ID in association with the user who has purchased the content. Specifically, the storage unit 22 stores the account ID of the user who has purchased the content and the identification ID of the user terminal 11 of the user in the storage device 13 in association with each other (see FIG. 4). Then, in a case in which the acquisition unit 21 acquires the identification ID of the printer 12, the storage unit 22 specifies the account ID of the user who has input the identification ID. Alternatively, the storage unit 22 specifies the identification ID of the user terminal 11 that has transmitted the data indicating the identification ID of the printer 12. Then, the storage unit 22 infers the user who has purchased the content from the identification ID of the specified user terminal 11, and stores the identification ID of the printer 12 in the storage device 13 in association with the user.

Moreover, in the present embodiment, the storage unit 22 stores the provision available period and the number of provision available times of the content in the storage device 13 for the user who has purchased the content (see FIG. 4). That is, the storage unit 22 stores the user who has purchased the content, and the provision available period and the number of provision available times of the content in the storage device 13 in association with each other.

The first generation unit 23 generates the image for obtaining the content, specifically an encoded image consisting of the QR code (registered trademark), for the content purchased by the user. The first generation unit 23 generates the image for obtaining the content in which the identification ID acquired by the acquisition unit 21 is embedded, together with the URL of the content obtaining destination, various parameters for obtaining the content, and the like. That is, the first generation unit 23 generates the image for obtaining the content as the image based on the acquired identification ID.

It should be noted that a well-known generation method can be used in a case of generating the encoded image in which various types of information are embedded, specifically, the image consisting of the QR code (registered trademark).

The first transmission unit 24 transmits the image for obtaining the content generated by the first generation unit 23 to the user terminal 11 of the user who has purchased the content. The user terminal 11 receives the image for obtaining the content by a known email reception function or a message reception function of the application for provision.

The reception unit 25 receives the first data and the second data from the user terminal 11 that has read the image for obtaining the content. The first data is data generated by reading the image for obtaining the content by the user terminal 11. Specifically, the first data indicates the image for obtaining the content (strictly speaking, a read image thereof), and various types of information embedded in the image are specified from the image for obtaining the content indicated by the first data. Here, the information specified from the image for obtaining the content indicated by the first data includes the identification ID of the printer 12 of the user acquired by the acquisition unit 21.

The second data is data for specifying the identification ID of the printer 12 of the user, and specifically, is data indicating the identification ID of the user terminal 11 that has read the image for obtaining the content. That is, since the identification ID of each of the user terminal 11 and the printer 12 of the user who has purchased the content is stored in the storage device 13 in a state of being associated with each other, the identification ID of the printer 12 can be specified from the identification ID of the user terminal 11 indicated by the second data.

The collation unit 26 executes collation processing based on the first data and the second data received by the reception unit 25. In the collation processing, it is collated whether or not the identification ID specified from the image for obtaining the content indicated by the first data and the identification ID of the printer 12 specified from the second data match.

Here, the match is not limited to a case in which the match is perfect, but can also include, for example, the match in a case in which the information which is a collation target is subjected to noise correction or the like.

It should be noted that, in the following, in the collation processing, the match between the identification IDs specified, respectively, from the first data and the second data is referred to as "ID match".

The second generation unit 27 generates data for the content for provision, that is, the content purchased by the user in a case in which a result of the ID match is obtained in the collation processing. The content data generated by the second generation unit 27 is data for control of the printer 12, and is data for printing the purchased content. Moreover, the content data is data that is valid only for the printer 12 that has the same identification ID as the identification ID acquired by the acquisition unit 21 (hereinafter, an acquired ID). That is, the purchased content can be output (printed) by the printer 12 only in a case in which the acquired ID and the identification ID of the printer 12 match.

Whether or not the acquired ID and the identification ID of the printer 12 match is determined by the user terminal 11 that has received the content data during execution of printing. Specifically, the content data includes the acquired ID, and the user terminal 11 determines whether or not the identification ID of the printer 12 and the acquired ID match.

It should be noted that the identification ID of the printer 12 which is a determination target may be an identification ID that is temporarily issued, for example, a one-time password. In that case, even in a case in which the identification ID of the printer 12 is determined to match the acquired ID and then disappears, the printer 12 has the identification ID that matches the acquired ID.

The second transmission unit 28 provides the content generated by the second generation unit 27 to the user who is the purchaser of the content. Specifically, the second transmission unit 28 transmits the purchased content to the user terminal 11 that has transmitted the first data and the second data. As described above, the content transmitted by the second transmission unit 28 is content that can be output in a case in which the acquired ID and the identification ID of the printer 12 match. Moreover, in the present embodiment, the second transmission unit 28 provides the content to the user only in a case in which it is determined in determination processing by the determination unit 29 that the content can be provided.

The determination unit 29 executes the determination processing for the user of the content provision destination, specifically, the user who uses the user terminal 11 that has transmitted the first data and the second data. In the determination processing, it is determined whether or not the content can be provided to the user of the content provision destination.

Specifically, the determination unit 29 refers to the data related to the user of the content provision destination out of the first management data stored in the storage device 13 for each user. Then, the determination unit 29 specifies the provision available period and the number of provision available times of the content purchased by the user from the referred data, and determines whether or not the user satisfies the content provision condition. Then, in a case in which the following results a1 to a3 are obtained, the determination unit 29 determines that the content can be provided to the user of the content provision destination.

a1) It is in the provision available period of the purchased content at a point in time of determination
   a2) The number of times the purchased content is provided to the user of the content provision destination so far is less than the number of provision available times
   a3) The user of the content provision destination satisfies the content provision condition Information Processing Flow for Providing Content According to One Embodiment of Present Invention An information processing flow (hereinafter, a content provision flow) by the content provision device according to one embodiment of the present invention will be described. In the content provision flow, the content provision method according to the embodiment of the present invention is adopted. In other words, each step in the content provision flow corresponds to a component of the content provision method according to the embodiment of the present invention.

The content provision flow is executed as the content protection control. The content protection control is a control flow for appropriately providing the content while protecting the content held by the content holder. Each step in the content provision flow is executed in cooperation with the processor 10A of the server for provision 10 constituting the content provision device 20 and the user terminal 11 and the printer 12 of the user who has purchased the content.

In the following, three cases will be described as scenes in which the content is purchased, and the content provision flow in each case will be described.

First Case

In the first case, one user (for example, a user X) inputs the information for obtaining a usage account of the content provision service.

Figure 7:
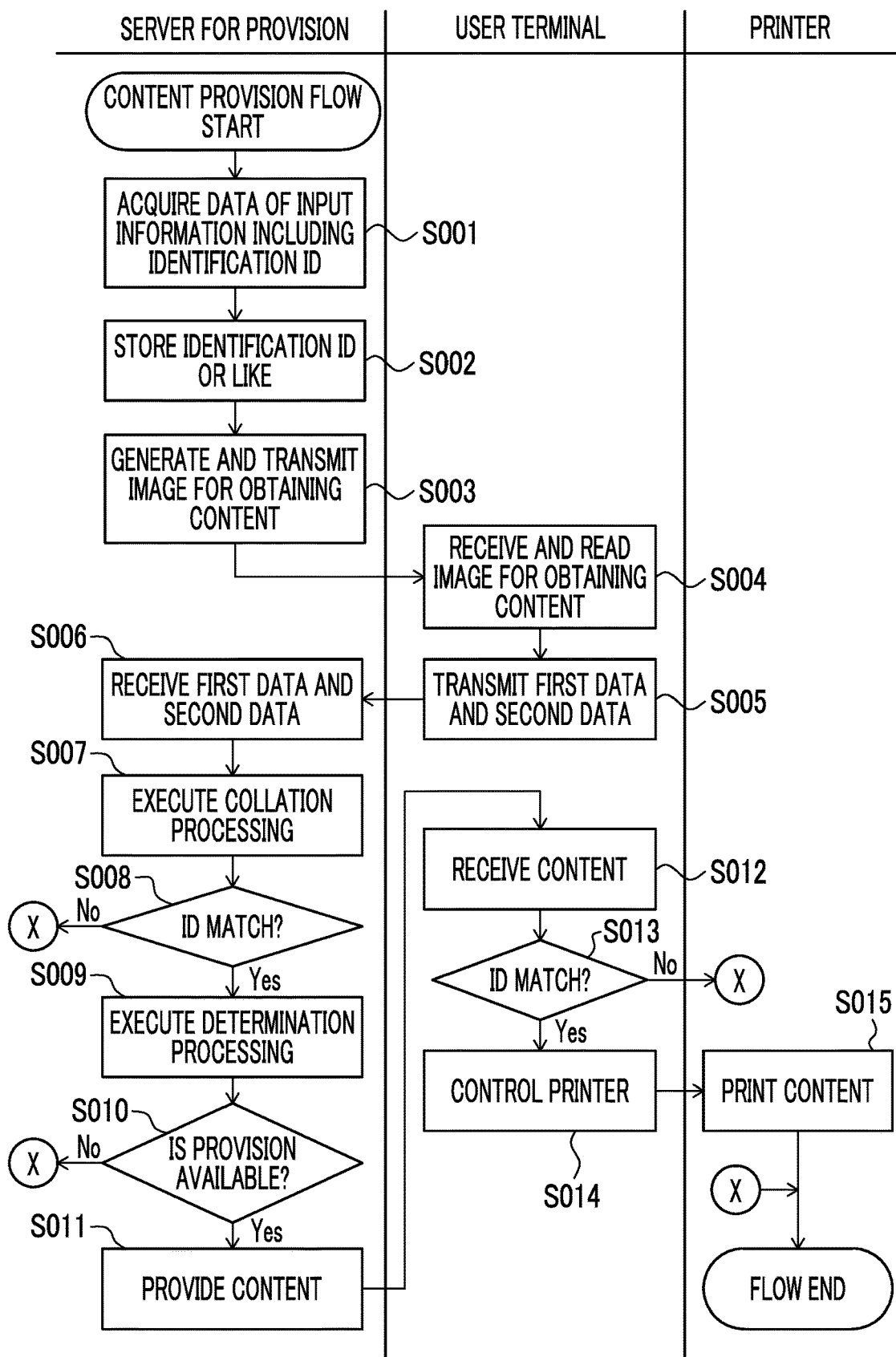
FIG. 7 is a diagram showing a first example of a content provision flow according to one embodiment of the present invention.

A content provision flow in a first case proceeds according to the flow shown in FIG. 7. Specifically, first, the processor 10A of the server for provision 10 acquires data indicating the information input by the user X (S001). The information indicated by the acquired data includes the identification ID of each of the user terminal 11 and the printer 12 used by the user X. The processor 10A stores the information indicated by the received data, that is, the identification ID and the like of each of the user terminal 11 and the printer 12 of the user X in the storage device 13 in association with the user X (S002).

Thereafter, the user X purchases the desired content from the content holder by a predetermined procedure. Along with the purchase of the content by the user X, the processor 10A generates the image for obtaining the content in which the identification ID of the printer 12 acquired in S001 is embedded, specifically, the QR code (registered trademark) (S003). Then, the processor 10A transmits the generated image for obtaining the content to the user terminal 11 of the user X (S003).

The user terminal 11 receives the image for obtaining the content and reads the image for obtaining the content by the function of the application for provision (S004). Then, along with the reading of the image for obtaining the content, the user terminal 11 transmits the first data and the second data to the server for provision 10 (S005). The first data is generated by reading the image for obtaining the content of the user terminal 11, and indicates the image for obtaining the content (specifically, the read image thereof). The second data is data for specifying the identification ID of the printer 12 of the user X, and specifically, is data indicating the identification ID of the user terminal 11 associated with the identification ID of the printer 12.

In a case in which the first data and the second data (S006) are received, the processor 10A executes the collation processing (S007). In the collation processing, it is collated whether or not the identification ID (that is, the acquired ID) specified from the image for obtaining the content indicated by the first data and the identification ID of the printer 12 of the user X specified from the second data match.

In a case in which the result of the ID match is obtained in the collation processing (Yes in S008), the processor 10A further executes the determination processing (S009). In the determination processing, it is determined whether or not the purchased content of the user X can be provided to the user X. Specifically, it is determined whether or not it is in the provision available period of the content at a point in time of the determination, whether or not the number of times the purchased content is provided to the user X is less than the number of provision available times, and whether or not the user X satisfies the content provision condition.

Then, in a case in which it is determined in the determination processing that the content can be provided (Yes in S010), the processor 10A provides the purchased content of the user X to the user X (S011). Specifically, the processor 10A generates data for printing of the purchased content and transmits the generated data to the user terminal 11 of the user X. In this case, the processor 10A transmits the data for printing in a state in which the identification ID (acquired ID) of the printer 12 acquired in step S001 is incorporated.

In a case in which the purchased content of the user X (S012) is received, the user terminal 11 determines whether or not the acquired ID incorporated in the content and the identification ID of the printer 12 of the user X match (S013). In a case in which the ID match is determined, the user terminal 11 controls the printer 12 and causes the printer 12 to output (print) the purchased content, and the printer 12 prints the purchased content (S014, S015).

With the procedure described above, the content provision flow in the first case ends.

As described above, with the content provision flow (that is, the content protection control) according to the present embodiment, it is possible to suppress the unpermitted obtaining of the content by a simple process.

More specifically, in the present embodiment, for the device used by the user to use the content, specifically, the printer 12, the identification ID which is the identification information thereof is acquired to generate the image for obtaining the content based on the acquired identification ID (acquired ID). On the user side, the image for obtaining the content is read, and the first data generated by the reading is transmitted from the user terminal 11. Moreover, the second data, which is data different from the first data, is transmitted from the user terminal 11. Then, in a case in which it is collated whether or not the identification ID (acquired ID) specified from the first data and the identification ID of the printer 12 specified from the second data match and the result of the ID match is obtained, the content is provided to the user.

As described above, unless the result of the ID match is obtained, the content is not provided, and the result of the ID match is not obtained, for example, even in a case in which another person reads the image for obtaining the content, so that the content is not provided to the other person. As a result, a situation in which a person other than the user who has purchased the content acquires the content without permission is avoided and the content is appropriately protected.

Moreover, in the method of causing the user to input the authentication information, such as the password or the code number, and providing the content to the user in a case in which the correct authentication information is input, as described above, a burden, such as remembering the authentication information, is imposed on the user. Moreover, there is a probability that the authentication information is lost due to carelessness of the user or the like.

On the other hand, in the present embodiment, there is no burden of remembering the authentication information, and a situation of loss of information due to carelessness does not occur. As a result, it is possible to more easily suppress unpermitted obtaining of the content.

Moreover, in the present embodiment, in a case in which the content is printed on the user side after the content is obtained, the collation between the identification ID of the printer 12 and the identification ID (acquired ID) incorporated in the content is executed again. Then, the content can be output (printed) only in the case in which the result of the ID match is obtained. As a result, it is possible to more reliably suppress unpermitted obtaining and unpermitted use of the content. That is, even in a case in which a person who has not purchased the content can obtain the content by some method, it is possible to suppress the printing of the content without permission by performing the ID collation at a stage of the printing.

Moreover, even for the user who has purchased the content, in a case in which the content can be obtained (downloaded) indefinitely, there is a concern that the content is resold and the content is not appropriately protected.

On the other hand, in the present embodiment, it is determined whether or not the content can be provided in a case of providing the content to the user, specifically, it is determined whether or not it is in the provision available period of the content, whether or not the number of times the content is provided to the user of the provision destination is less than the number of provision available times, and whether or not the user of the provision destination satisfies the content provision condition. Then, the content is provided to the user only in a case in which it is determined that the content can be provided. By providing the limitation on the provision of the content to the user in this way, it is possible to suppress inappropriate use of the provided content.

Second Case

Figure 8:
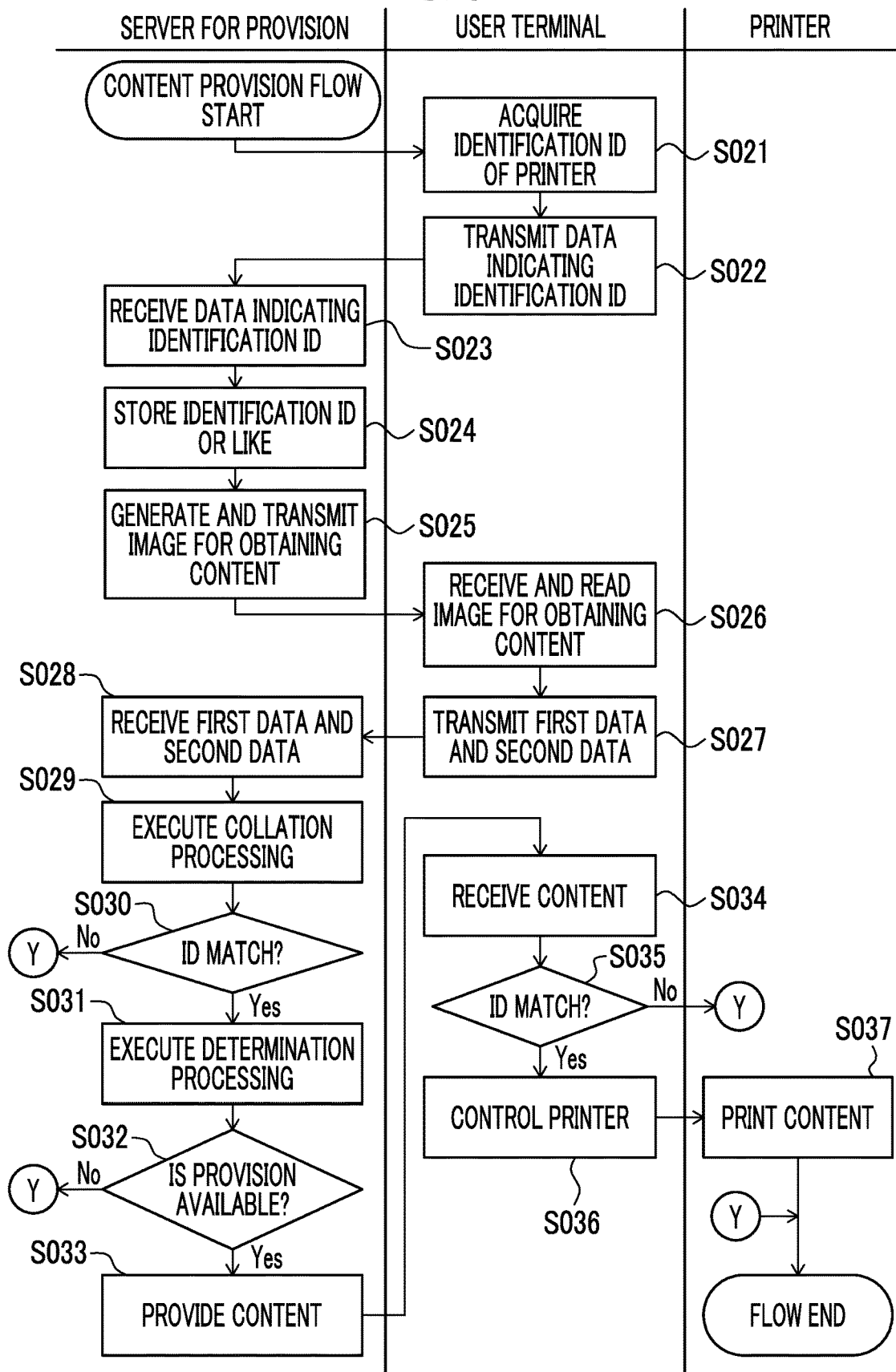
FIG. 8 is a diagram showing a second example of the content provision flow according to one embodiment of the present invention.

A content provision flow in a second case proceeds according to the flow shown in FIG. 8. In the second case, the user terminal 11 of the user (for example, the user X) who has purchased the content communicates with the printer 12 of the user X and automatically acquires the identification ID of the printer 12 (S021). The user terminal 11 transmits data indicating the acquired identification ID to the server for provision 10 (S022), and the processor 10A of the server for provision 10 receives the data described above (S023). As a result, the processor 10A acquires the identification ID of the printer 12 of the user X.

Moreover, the data transmitted by the user terminal 11 in step S022 includes the identification ID of the user terminal 11. Therefore, in step S023, the processor 10A acquires the identification ID of the user terminal 11 of the user X together with the identification ID of the printer 12.

Then, the processor 10A stores the identification ID and the like of each of the user terminal 11 and the printer 12 of the user X in the storage device 13 in association with the user X (S024). Subsequent steps S025 to S037 are the same as steps S003 to S015 in the first case, as shown in FIGS. 7 and 8.

As described above, in the second case, since the user terminal 11 and the printer 12 of the user X are communicably connected to each other, the user terminal 11 automatically acquires the identification ID of the printer 12. In other words, in the second case, the user terminal 11 has a function of automatically acquiring the identification ID of the printer 12. As a result, it is possible to reduce a burden on the user, specifically, the time and effort for the user to grasp the identification ID of the printer 12 and input the identification ID.

More specifically, in the first case, it is necessary for the user to input the information including the identification ID of the printer 12 or the like as work for issuing the account. That is, unless the user grasps and inputs the identification ID of the printer 12, the user cannot use the content provision service and cannot obtain the content. Moreover, in general, the user does not tend to recognize the identification ID of the printer 12. Therefore, the user cannot issue the account and cannot use the content provision service until the identification ID of the printer 12 is found. Moreover, in a case in which the identification ID of the printer 12 is input in a case of using the service, there is a concern that a person who notices from that fact that the identification ID is key information (information necessary for obtaining the content) in a case of using the service appears and the person illegally acquires and uses the identification ID.

On the other hand, in the second case, as described above, the user terminal 11 automatically acquires the identification ID of the printer 12. As a result, it is possible for the user to obtain the content without being aware of the identification ID. Moreover, since the input operation for the identification ID by the user is not necessary, it is possible to suppress unpermitted obtaining of the content by an easy (simple) procedure for the user.

Third Case

In a third case, one user (for example, the user X) purchases the content related to the event at the venue of the event, such as a concert.

Figure 9:
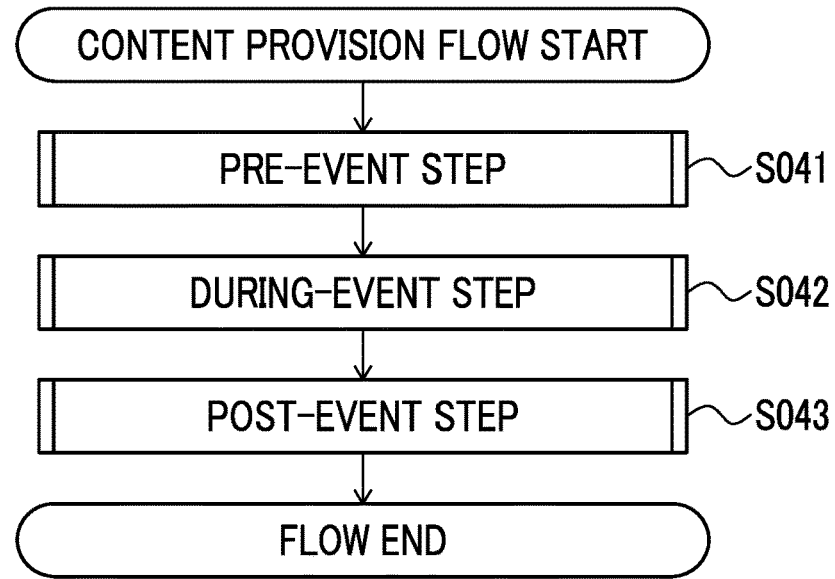
FIG. 9 is a diagram showing a third example of the content provision flow according to one embodiment of the present invention.

As shown in FIG. 9, a content provision flow in the third case is divided into pre-event, during-event, and post-event steps (S041, S042, S043), but the steps executed during the flow are the same as in the second case.

In the pre-event step, the user X connects the user terminal 11 and the printer 12. As a result, as in the second case, the user terminal 11 communicates with the printer 12 and automatically acquires the identification ID of the printer 12 (S021).

In the during-event step, the user X accesses a content purchase site from information of the content purchase site (for example, the URL of the content purchase site) described on a screen, a poster, or the like in the venue. Then, the user X purchases the desired content at the content purchase site. Along with the purchase of the content, the user terminal 11 of the user X transmits the data indicating the identification ID of each of the user terminal 11 and the printer 12 to the server for provision 10 together with the data indicating the information necessary for purchasing the content (S022).

In the server for provision 10, the image for obtaining the content is generated based on the information indicated by the data received from the user terminal 11, specifically, the identification ID of the printer 12, and is transmitted to the user terminal 11 (S023 to S025). As described above, at the stage during the event, the image for obtaining the content is provided to the user X instead of the purchased content itself. The reason of the above is because the capacity of the purchased content may be relatively large, and there is a probability that an attempt to obtain (download) the purchased content during the event fails. As long as the image for obtaining the content is provided, even in a case in which the download fails and is interrupted, it is possible to redo the download (restart the download).

The post-event step is executed immediately after the event or at a point in time at which the user X returns home from the event. In the post-event step, a step of reading the image for obtaining the content to a step of obtaining the purchased content and printing the purchased content by the printer 12 are executed (S026 to S037).

In the third case, the user terminal 11 acquires the identification ID of the printer 12 in advance before the event, so that the data indicating the identification ID of the printer 12 can be transmitted from the user terminal 11 during the event. Moreover, since the purchased content can be obtained (downloaded) after the event, the user X can print the purchased content at any timing after the event without having to bother to bring the printer 12 to the event venue.

Other Embodiments

The embodiment described above is a specific example given to describe the content provision device and the content provision method according to the embodiment of the present invention in an easy-to-understand manner and is merely an example, and other embodiments can also be considered.

In the embodiment described above, the content, specifically, the data for printing the content is received by the user terminal 11, but the present invention is not limited to this. For example, the printer 12 may receive the content (data for printing) directly from the server for provision 10.

Figure 10:
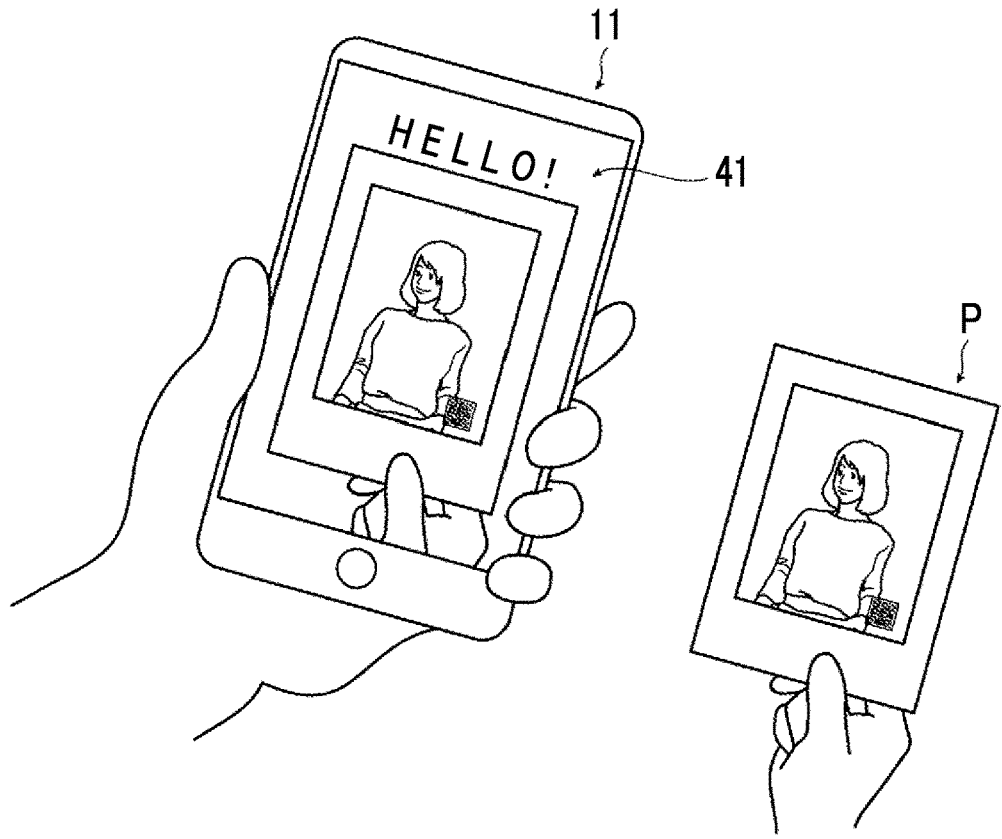
FIG. 10 is a diagram showing an example of the content provided in one embodiment of the present invention.

Moreover, in the embodiment described above, the content to be provided is the image, specifically, the image that can be printed by the printer 12, but the present invention is not limited to this. The content that can be provided may be content that can be used through the user terminal 11, specifically, content that can be displayed or reproduced on the user terminal 11. For example, video content for augmented reality (AR) that is combined with a captured video captured by the user terminal 11 and displayed, as shown in FIG. 10, may be adopted.

In a case of obtaining the video content for AR described above (hereinafter, AR content 41), the user acquires an image for displaying the AR content by the same procedure as the procedure in the embodiment described above. Then, the user prints the acquired image by the printer 12 and takes a printed matter P. Thereafter, the user images the printed matter P by the user terminal 11 to read the image for displaying the AR content printed on the printed matter P, and requests the server for provision 10 to provide the AR content 41 based on the information embedded in the read image. The server for provision 10 provides the AR content 41 to the user in response to the request described above, and more specifically, generates data for displaying the AR content and transmits the data for displaying the AR content to the user terminal 11. In the user terminal 11 that has received the data, the captured video of the printed matter P is displayed on the screen, and the AR content 41 is displayed in a state of being combined with the captured video.

Here, the AR content 41 is provided by using, as a trigger, the reading of the image for displaying the AR content printed on the printed matter P. Moreover, the image for displaying the AR content is provided on a condition that the result of the ID match is obtained for the identification ID of the printer 12. Therefore, it can be said that the AR content 41 is the content obtained in a case in which the result of the ID match is obtained.

It should be noted that the AR content 41 may be, for example, a text (message), content consisting of a moving image or a video, or an illustration drawn by computer graphics. Moreover, the AR content 41 may be content that is combined with another video to add a predetermined background effect. Moreover, the AR content 41 may be displayed in a stationary state, may be displayed in a moving state, such as a moving image, or may be displayed with an audio output.

Moreover, in the embodiment described above, in a case in which the image for obtaining the content is received by the user terminal 11, the image for obtaining the content is read by the function of the application for provision installed in the user terminal 11. It should be noted that the present invention is not limited to this, and for example, the printed matter on which the image for obtaining the content is printed may be distributed to the user (specifically, the content purchaser) by mail or the like. In this case, the image for obtaining the content may be read by imaging (capturing) the printed image for obtaining the content by the imaging device mounted on the user terminal 11.

Moreover, the device that reads the image for obtaining the content is not limited to the user terminal 11. For example, in a case in which the printer 12 has a function of receiving the image and reading the image, the printer 12 may read the image for obtaining the content. In this case, the first data and the second data may be transmitted from the printer 12, and the second data may be data indicating the identification ID of the printer 12.

Moreover, in the embodiment described above, one user reads the image for obtaining the content by the user terminal 11 and executes the collation processing based on the first data and the second data transmitted from the user terminal 11. Then, in a case in which the identification IDs specified, respectively, from the first data and the second data match, the content is provided to the user. It should be noted that the present invention is not limited to this, and for example, at least one of the identification information specified from the first data or the identification information specified from the second data may be information associated with a plurality of users. In that case, one of the plurality of users may read the image for obtaining the content, and may determine that the identification IDs specified from the first data and the second data generated in that case match. Specifically, it is assumed that one of the family members purchases authorized content that can be shared by the entire family, and any one of the family members reads the image for obtaining the content on his/her terminal. In this case, in a case in which the identification IDs are specified from the first data and the second data generated by reading the image for obtaining the content, it is determined that the identification IDs match.

The processor provided in the content provision device according to the embodiment of the present invention includes various processors. Examples of the various processors include a CPU, which is a general-purpose processor that executes software (program) and functions as various processing units.

Moreover, various processors include a programmable logic device (PLD), which is a processor of which a circuit configuration can be changed after manufacturing, such as a field programmable gate array (FPGA).

Moreover, the various processors described above also include a dedicated electric circuit, which is a processor having a circuit configuration specially designed for executing specific processing, such as an application specific integrated circuit (ASIC).

Moreover, one functional unit provided in the content provision device according to the embodiment of the present invention may be composed of one of the various processors described above, or may be composed of a combination of two or more processors of the same type or different types, for example, a combination of a plurality of FPGAs or a combination of the FPGA and the CPU.

Moreover, a plurality of functional units provided in the content provision device according to the embodiment of the present invention may be composed of one of various processors, or may be composed of one processor in which two or more of the plurality of functional units are combined.

Moreover, as in the embodiment described above, a form may be adopted in which one processor is composed of a combination of one or more CPUs and software, and the processor functions as the plurality of functional units.

Moreover, for example, as represented by a system on chip (SoC) or the like, a form may be adopted in which a processor is used in which the functions of the entire system which includes the plurality of functional units in the content provision device according to the embodiment of the present invention are realized by a single integrated circuit (IC) chip. Moreover, a hardware configuration of the various processors described above may be an electric circuit (circuitry) in which circuit elements, such as semiconductor elements, are combined.

EXPLANATION OF REFERENCES

10: server for provision (computer)
10A: processor
10B: memory
10C: communication interface
11: user terminal (reading device)
12: printer (device used by user to use content)
13: storage device
20: content provision device
21: acquisition unit
22: storage unit
23: first generation unit
24: first transmission unit
25: reception unit
26: collation unit
27: second generation unit
28: second transmission unit
29: determination unit
41: AR content
N: external network
P: printed matter
S: content provision system

What is claimed is:

1. A content provision device that provides content to a user, the device comprising:
   a processor,
   wherein the processor is configured to execute
      processing of acquiring identification information of a device used by the user to use the content and transmitting an image based on the identification information to a reading device of the user, the reading device being configured to communicate with the content provision device via an external network,
      processing of receiving first data, which is generated by reading the image by the reading device of the user, and second data for specifying the identification information from the reading device, and
      processing of providing the content to the user in a case in which the identification information specified from the image indicated by the first data and the identification information specified from the second data match.

2. The content provision device according to claim 1, wherein the processor is configured to provide the content that is able to be output in a case in which the acquired identification information and the identification information of the device match.

3. The content provision device according to claim 1,
wherein the processor is configured to acquire an identification ID of a printer that prints the content, as the identification information.

4. The content provision device according to claim 3,
wherein, in a case in which a user terminal that is able to control the printer acquires the identification ID of the printer, the processor is configured to acquire the identification ID by receiving data indicating the identification ID transmitted from the user terminal.

5. The content provision device according to claim 1,
wherein the processor is configured to transmit content that is usable through the reading device to the reading device, as the content.

6. The content provision device according to claim 5,
wherein the content that is usable through the reading device is video content for augmented reality that is combined with a captured video captured by the reading device and displayed.

7. The content provision device according to claim 1,
wherein the processor is configured to store a provision available period of the content in a storage device in association with the user, and
the processor is configured to provide the content to the user in the provision available period.

8. The content provision device according to claim 1,
wherein the processor is configured to store the number of provision available times of the content in a storage device in association with the user, and
in a case in which the number of times the content is provided is less than the number of provision available times, the processor is configured to provide the content to the user.

9. The content provision device according to claim 1,
wherein, in a case in which the identification information specified from the image indicated by the first data and the identification information specified from the second data match and the user satisfies a preset condition, the processor is configured to provide the content to the user.

10. A content provision method of providing content to a user, the method comprising:
causing a processor to execute
a step of acquiring identification information of a device used by the user to use the content and transmitting an image based on the identification information to a reading device of the user, the reading device being configured to communicate with the processor via an external network,
a step of receiving first data, which is generated by reading the image by the reading device of the user, and second data for specifying the identification information from the reading device, and
a step of providing the content to the user in a case in which the identification information specified from the image indicated by the first data and the identification information specified from the second data match.

11. The content provision method according to claim 10,
wherein the processor provides the content that is able to be output in a case in which the acquired identification information and the identification information of the device match.

12. A non-transitory computer-readable recording medium having a program causing a computer to execute each step included in the content provision method according to claim 11 recorded thereon.

13. The content provision method according to claim 10,
wherein the processor transmits content that is usable through the reading device to the reading device, as the content.

14. A non-transitory computer-readable recording medium having a program causing a computer to execute each step included in the content provision method according to claim 13 recorded thereon.

15. The content provision method according to claim 10,
wherein, in a case in which the identification information specified from the image indicated by the first data and the identification information specified from the second data match and the user satisfies a preset condition, the processor provides the content to the user.

16. A non-transitory computer-readable recording medium having a program causing a computer to execute each step included in the content provision method according to claim 15 recorded thereon.

17. A non-transitory computer-readable recording medium having a program causing a computer to execute each step included in the content provision method according to claim 10 recorded thereon.

* * * * *